(12) United States Patent
Suzuki et al.

(10) Patent No.: US 8,648,847 B2
(45) Date of Patent: Feb. 11, 2014

(54) LED DRIVING APPARATUS WHICH CONTROLS BASED ON LED STATE

(75) Inventors: Shinichi Suzuki, Nagano (JP); Shingo Takatsuka, Nagano (JP)

(73) Assignee: Minebea Co., Ltd., Nagano (JP)

( * ) Notice: Subject to any disclaimer, the term of this patent is extended or adjusted under 35 U.S.C. 154(b) by 159 days.

(21) Appl. No.: 13/371,821

(22) Filed: Feb. 13, 2012

(65) Prior Publication Data

US 2012/0206433 A1 Aug. 16, 2012

(30) Foreign Application Priority Data

Feb. 15, 2011 (JP) ................................. 2011-030175

(51) Int. Cl.
*G06F 3/038* (2013.01)

(52) U.S. Cl.
USPC .......................................... 345/211; 345/102

(58) Field of Classification Search
USPC ................... 345/76, 204, 211, 213, 214, 212; 315/169.3
See application file for complete search history.

(56) References Cited

U.S. PATENT DOCUMENTS

2006/0256050 A1* 11/2006 Ikeda ............................... 345/82
2009/0015759 A1* 1/2009 Honbo ............................. 349/69
2010/0177127 A1* 7/2010 Akiyama et al. ............... 345/690

FOREIGN PATENT DOCUMENTS

JP 2010-161264 A 7/2010

* cited by examiner

*Primary Examiner* — Pegeman Karimi
(74) *Attorney, Agent, or Firm* — Carrier Blackman & Associates, P.C.; Joseph P. Carrier; William D. Blackman

(57) ABSTRACT

An LED driving apparatus comprising: a power feed unit; a driving control unit; a current detection unit that detects load current flowing in an LED module; and an output control unit that determines whether the LED module is under conducting state or opening state, and outputs a signal in accordance with a result of the determination, wherein, when the LED module is under conducting state, the output control unit outputs a first signal to the driving control unit so that the load current is constant, wherein, when the LED module is under opening state, the output control unit outputs a second signal to the driving control unit so that a voltage becomes a predetermined constant-voltage value, and wherein the predetermined voltage value is a voltage or higher, at which the LED module starts conduction, and a voltage or lower corresponding to an upper limit of the LED.

2 Claims, 5 Drawing Sheets

BACK GROUND ART

LED DRIVING APPARATUS WHICH CONTROLS BASED ON LED STATE

CROSS-REFERENCE TO RELATED APPLICATION

This application claims priority from Japanese Patent Application No. 2011-030175 filed on Feb. 15, 2011, the entire subject matter of which is incorporated herein by reference.

TECHNICAL FIELD

The invention relates to an Light Emitting Diode (LED) driving apparatus, and specifically, to an LED driving apparatus that appropriately performs control, based on whether an LED is under opening state or conducting state.

BACK GROUND

An LED module and an LED driving apparatus for driving the LED module are widely known, for example, in an illumination apparatus and the like. It is known that an LED module includes at least one or more LED arrays having at least one or more light emitting diodes (hereinafter, also referred to as 'LED'). Here, in the LED module having two or more LED arrays, the respective LED arrays are connected in parallel with each other. Also, in the LED array having two or more LEDs, the respective LEDs are connected to each other in series.

JP-A-2010-161264 discloses an LED driving circuit driving a light source, in which LED strings having LEDs connected in series are arranged in parallel. The LED driving circuit drives the LEDs at constant-current, thereby making luminance of the LEDs uniform.

However, according to the above LED driving apparatus, when the LED module becomes under opening state, i.e., abnormal state, control of regulating an output voltage to the LED module may be performed. The control is performed with considering temperatures of the LED module, non-uniformity of forward voltages $V_F$ of the individual LEDs, and the like. A value of the output voltage is set to be larger than a predetermined voltage corresponding to an upper limit of load current that is supplied to the LED module.

When the opening state of the LED module is kept at a state in which the control of regulating the value of the output voltage is performed and the value of the output voltage is large, the charges are kept with being charged in a smoothing capacitor that is arranged at an output-side after power conversion. At this state, when the LED module becomes under conducting state, i.e., normal state, excessive inrush current instantaneously flows in the LED module. When the inrush current flows, the LEDs configuring the LED module may be damaged or burned out.

The above phenomenon may be occurred in a following case. That is, in case that the LED driving apparatus and the LED module are connected by using a connector and the like, the connection between the LED driving apparatus and the LED module may be inappropriate or unstable. As one example, in case that the LED module is connected to the LED driving apparatus being under conducting state, a user may connect the LED driving apparatus and the LED module in an erroneous connection direction (polarity and the like). As another example, a connector of the LED driving apparatus and a connector of the LED module may be imperfectly connected or an electrical contact of the LED driving apparatus and the LED module may disappear temporarily. In this case, when LED driving apparatus and the LED module are again connected correctly or the electrical contact thereof is recovered, the inrush current may flow in the LED module.

FIG. 5 is a graph illustrating an example of a change in current that is supplied when an LED module is attached to and detached from a background LED driving apparatus.

In FIG. 5, the LED module is under conducting state at time T0. As shown in FIG. 5, a current value is zero (0) before time T0 and the LED module is not under conducting state. Just after time T0, i.e., when the LED module is under conducting state, the current value abruptly increases from zero (0) and the inrush current $I_{F_p}$ instantaneously flows in the LED module. After the inrush current $I_{F_p}$ flows, the current value decreases and constant forward current $I_F$ flows. A quality of the LED is considerably deteriorated due to the inrush current $I_{F_p}$.

For solving the above problem, a configuration has been known in which an inductor is connected to a power feed line after power conversion in series with the LED module.

FIG. 6 is a circuit diagram illustrating an example of a configuration of a background LED driving apparatus.

An example of a configuration of an background LED driving apparatus, in which an inductor is provided, is described with reference to FIG. 6. An LED driving apparatus 801 has an output control unit 802, a power conversion unit 807, a driving control unit 808 and a current detection unit 810. The power conversion unit 807 has an interference suppression unit 807a that performs a noise measure, a rectification unit 807b that rectifies alternating current, a power factor improvement unit 807c and a power conversion circuit 807d that is a DC/DC converter. The LED driving apparatus 801 converts alternating current power from an alternating current power supply $V_{AC}$ into direct current power in the power conversion unit 807 and feeds the direct current power to the LED module 500. An inductor L1 is connected to a power feed line from the power conversion unit 807 to the LED module 500 in series with the LED module 500.

The output control unit 802 has a constant-current control unit 803 and a constant-voltage control unit 804. When the LED module 500 is under conducting state (normal state), a constant-current control of making current $I_F$ flowing in the LED module 500 constant is performed. When the LED module 500 is under opening state (abnormal state), an operation of the constant-voltage control unit 804 of the output control unit 802 is enabled based on a detection value of the current detection unit 810. At this time, the constant-voltage control unit 804 outputs a feedback signal for driving voltage setting to the driving control unit 808, based on a detection value of a voltage $V_A$ supplied to the LED module and a reference voltage value $V_{TH3}$. The feedback signal is a signal for outputting a voltage, which is higher than a voltage corresponding to an upper limit of load current to be supplied to the LED module 500, for example a voltage value $V_{O4}$ shown in FIG. 3, to the power conversion unit 807. The reason is as follows. In order to securely conduct the LED module 500 when the LED module 500 is attached and detached during the operation of the LED driving apparatus 801, a voltage is necessary which is higher than the maximum voltage to be applied to the LED module 500 under conducting state (normal state), with considering the non-uniformity of properties such as temperature characteristics and forward voltages $V_F$ of the respective LEDs, the environment change and the like. By performing the above control, even when addition values of the forward voltages $V_F$ of the LEDs of the respective LED arrays are increased due to the non-uniformity of properties of the individual LEDs, the environment change and the like, it is possible to turn on the LEDs instantaneously and securely.

Here, when the charges of a capacitor C1 are charged by the high voltage at the time of opening state, the excessive current (inrush current) flows toward the LED module 500 in attaching and detaching the LED module 500, so that the qualities of the individual LEDs and the LED module are considerably deteriorated. On the other hand, according to the LED driving apparatus 801, the high inrush current does not flow to the LED module by the function of the inductor even for the above case, so that it is possible to protect the LED module.

However, according to the configuration of connecting the inductor as described above, an inductor having a high inductance value is required. Accordingly, it is difficult to make the LED driving apparatus small and the manufacturing cost of the LED driving apparatus is increased.

Additionally, JP-A-2010-161264 does not disclose an effective solution for the above problems.

SUMMARY OF THE INVENTION

With considering the above, this disclosure provides an LED driving apparatus, which may be miniaturized, may have a low manufacturing cost and may suppress an LED from being out of order due to inrush current.

A Light Emitting Diode driving apparatus of this disclosure that drives an LED module having at least one LED, comprises: a power feed unit that feeds direct current power to the LED module; a driving control unit that performs driving control of the power feed unit; a current detection unit that detects load current flowing in the LED module; and an output control unit that determines whether the LED module is under conducting state or opening state in accordance with a detection result of the current detection unit, outputs a signal to the driving control unit in accordance with a result of the determination, and thus controls an output from the power feed unit, wherein, when the LED module is under conducting state, the output control unit outputs a first signal to the driving control unit so that the load current is constant when a voltage is applied to the LED module by the power feed unit, wherein, when the LED module is under opening state, the output control unit outputs a second signal to the driving control unit so that a voltage, which is applied to the LED module by the power feed unit, becomes a predetermined constant-voltage value, and wherein the predetermined voltage value is a voltage or higher, at which the LED module starts conduction, and a voltage or lower corresponding to an upper limit of the load current when the LED module is under conducting state.

In the above-described LED driving apparatus, the output control unit may have a constant-current control unit that performs constant-current control and a constant-voltage control unit that performs constant-voltage control, wherein, when the LED module is under conducting state, by using: a voltage corresponding to the load current detected by the current detection unit; and a first reference value that is a reference voltage for generating the first signal, as inputs, the constant-current control unit performs the constant-current-control based on a comparison result of the inputs, and wherein, when the LED module is under opening state, by using: a voltage corresponding to the load current detected by the current detection unit; a voltage based on an output voltage of the power feed unit; a second reference value that is a voltage for generating the second signal; and an opening state detecting signal from the constant-current control unit, as inputs, the constant-voltage control unit generates a third reference value, based on the second reference value and the opening state detecting signal, and outputs the second signal based on a comparison result of the voltage based on the output voltage of the power feed unit and the third reference value, and thus the constant-voltage control perfumes unit performs the constant-voltage control on the output voltage of the power feed unit.

In the above-described LED driving apparatus, when the LED module is under conducting state, the constant-current control unit may output the first signal to the driving control unit, based on a comparison result of the voltage corresponding to the load current and the first reference value, and when the LED module is under opening state, the constant-current control unit may stop the output of the first signal, and wherein, when the LED module is under opening state, the constant-voltage control unit may output the second signal to the driving control unit, based on a comparison result of the voltage based on the output voltage and the second reference value, and when the LED module is under conducting state, the constant-voltage control unit may stop the output of the second signal.

According to this disclosure, when the LED module is under opening state, the output voltage to the LED module is controlled to be lower than a voltage corresponding to the upper limit of the load current. Therefore, it is possible to provide the LED driving apparatus, which may be miniaturized, may have a low manufacturing cost and may suppress an LED from being out of order due to inrush current.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

Hereinafter, an LED driving apparatus according to an illustrative embodiment of this disclosure will be described with reference to the drawings.

An LED driving apparatus feeds direct current power to an LED module having one or more LEDs and thus drives the LED module. The LED module is used for an illumination apparatus, for example. In this illustrative embodiment, the LED driving apparatus converts alternating current power into direct current power and feeds the converted direct current power to the LED module. The LED driving apparatus is configured to prevent inrush current from flowing in the LED module when connecting the LED module, for example.

Illustrative Embodiment

First, a circuit configuration of an LED driving apparatus 1 according to an illustrative embodiment of this disclosure is described.

Figure 1:
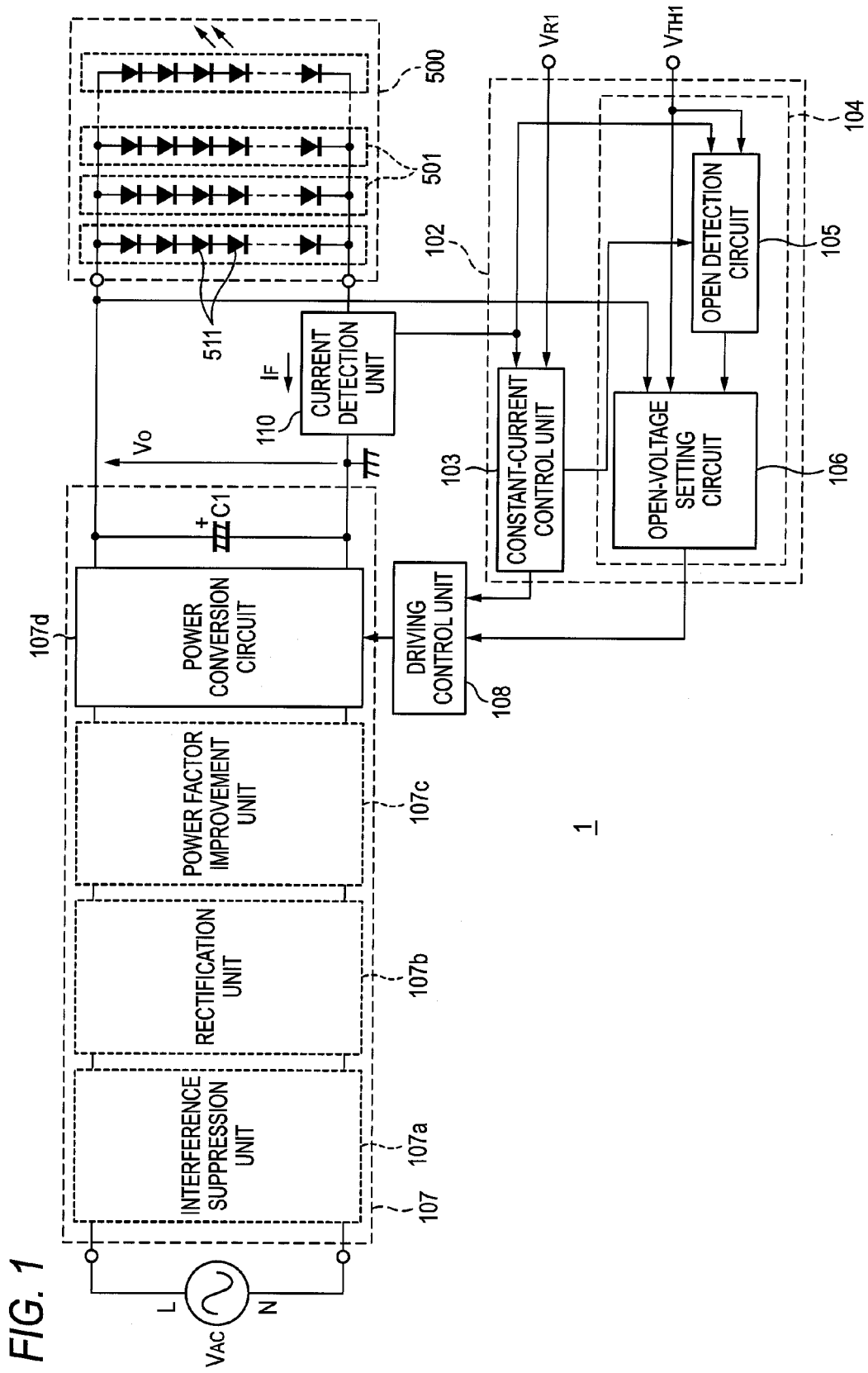
FIG. 1 is a circuit diagram illustrating a configuration of an LED driving apparatus according to an illustrative embodiment of this disclosure.

FIG. 1 is a circuit diagram illustrating a configuration of the LED driving apparatus 1 according to an illustrative embodiment of this disclosure.

As shown in FIG. 1, the LED driving apparatus 1 has an output control unit 102, a power conversion unit 107 (which is an example of a power feed unit), a driving control unit 108 and a current detection unit 110. The output control unit 102 has a constant-current control unit 103 and a constant-voltage control unit 104. The power conversion unit 107 is connected to an alternating current power supply $V_{AC}$. The power conversion unit 107 converts alternating current power from the alternating current power supply $V_{AC}$ into direct current power and outputs. As the direct current power is fed from the power conversion unit 107 to an LED module 500, the LED module 500 is driven.

The LED module 500 has a plurality of LED arrays 501. Each of the LED arrays 501 is connected to the power conversion unit 107 and is connected in parallel with the other LED arrays 501. Each LED array 501 has a plurality of LEDs 511. In each LED array 501, each of the LEDs 511 is connected in series with the other LEDs 511. Like this, the LED module 500 is configured by the LEDs 511 of m rows and n columns (m, n: 2 or larger).

The constant-current control unit 103 outputs a signal to the driving control unit 108, based on an output of the current detection unit 110 and a first reference value $V_{R1}$. The first reference value $V_{R1}$ is a voltage that is a basis of the constant-current-control. In the meantime, the first reference value $V_{R1}$ is a reference value of the constant-current control and an operating value for dimming control of the LED module 500.

The constant-voltage control unit 104 has an open detection circuit 105 and an open-voltage setting circuit 106. The open detection circuit 105 outputs a signal to the open-voltage setting circuit 106, based on an output of the current detection unit 110, an output of the constant-current control unit 103 and a second reference value (voltage) $V_{TH1}$ for generating a reference value of constant-voltage control. The open-voltage setting circuit 106 outputs a signal to the driving control unit 108, based on a voltage of a high-voltage side of power feed lines to the LED module, i.e., an applied voltage to the LED module 500, the signal from the open detection circuit 105 and a third reference value $V_{TH2}$ that is generated from the second reference value $V_{TH1}$, and performs constant-voltage controlling of the voltage of the high-voltage side of the power feed lines to the LED module, i.e., the applied voltage to the LED module 500. Meanwhile, in this illustrative embodiment, a value of the applied voltage to the LED module 500 is the substantially same as an output voltage $V_O$ of the power conversion unit 107.

The power conversion unit 107 has an interference suppression unit 107a, a rectification unit 107b, a power factor improvement unit 107c, a power conversion circuit 107d and a capacitor C1. The interference suppression unit 107a is a filter circuit that is provided to the power feed lines from the alternating current power supply $V_{AC}$ to the rectification unit 107b, and the filter circuit suppresses a noise from being leaked or introduced through a wiring. The rectification unit 107b rectifies the alternating current that is supplied from the alternating current power supply $V_{AC}$. The power factor improvement unit 107c is a Power Factor Correction (PFC) circuit that improves a power factor of the output of the rectification unit 107b. The power conversion circuit 107d is a DC/DC converter. The power conversion circuit 107d converts and outputs direct current power to be fed to the LED module 500, in accordance with the control of the driving control unit 108. The power conversion circuit 107d and the LED module 500 are connected to each other by two power feed lines of a low-voltage side line and a high-voltage side line. The low-voltage side line is connected to a ground potential, for example.

The capacitor C1 is a smoothing capacitor and is connected to the feed lines of the direct current power from the power conversion circuit 107d to the LED module 500, in line with the LED module 500. That is, one end of the capacitor C1 is connected to the high-voltage side line of the power feed lines to the LED module 500 and the other end is connected to the low-voltage side line that is a ground potential.

In the meantime, the power conversion unit 107 is not limited to the above configuration. For example, the interference suppression unit 107a, the rectification unit 107b and the power factor improvement unit 107c may be appropriately provided depending on the circuit configuration of the power conversion unit 107. Also, the power conversion unit 107 may include a circuit other than the above configuration.

The driving control unit 108 controls the power conversion circuit 107d in accordance with the signals output from the constant-current control unit 103 and the open-voltage setting circuit 106. The driving control unit 108 controls the power conversion circuit 107d to feed the direct current power from the power conversion unit 107 to the LED module 500, thereby driving the LED module 500.

The current detection unit 110 is arranged at the low-voltage side line that connects the power conversion unit 107d and the LED module 500. The current detection unit 110 is connected between an end of a cathode of the LED module 500 and the ground potential. The current detection unit 110 detects load current $I_F$ flowing in the LED module 500. The current detection unit 110 outputs a voltage, as a detection value, corresponding to the load current $I_F$ to the output control unit 102, for example. Also, the constant-current control unit 103 outputs an open detection signal to the open detection circuit 105, based on a detection result of the current detection unit 110. Thereby, the output control unit 102 determines whether the LED module 500 is under conducting state (normal state) or opening state (abnormal state), and performs the constant-current control when the LED module is under conducting state (normal state) and the constant-voltage control when the LED module is under opening state (abnormal state).

Figure 2:
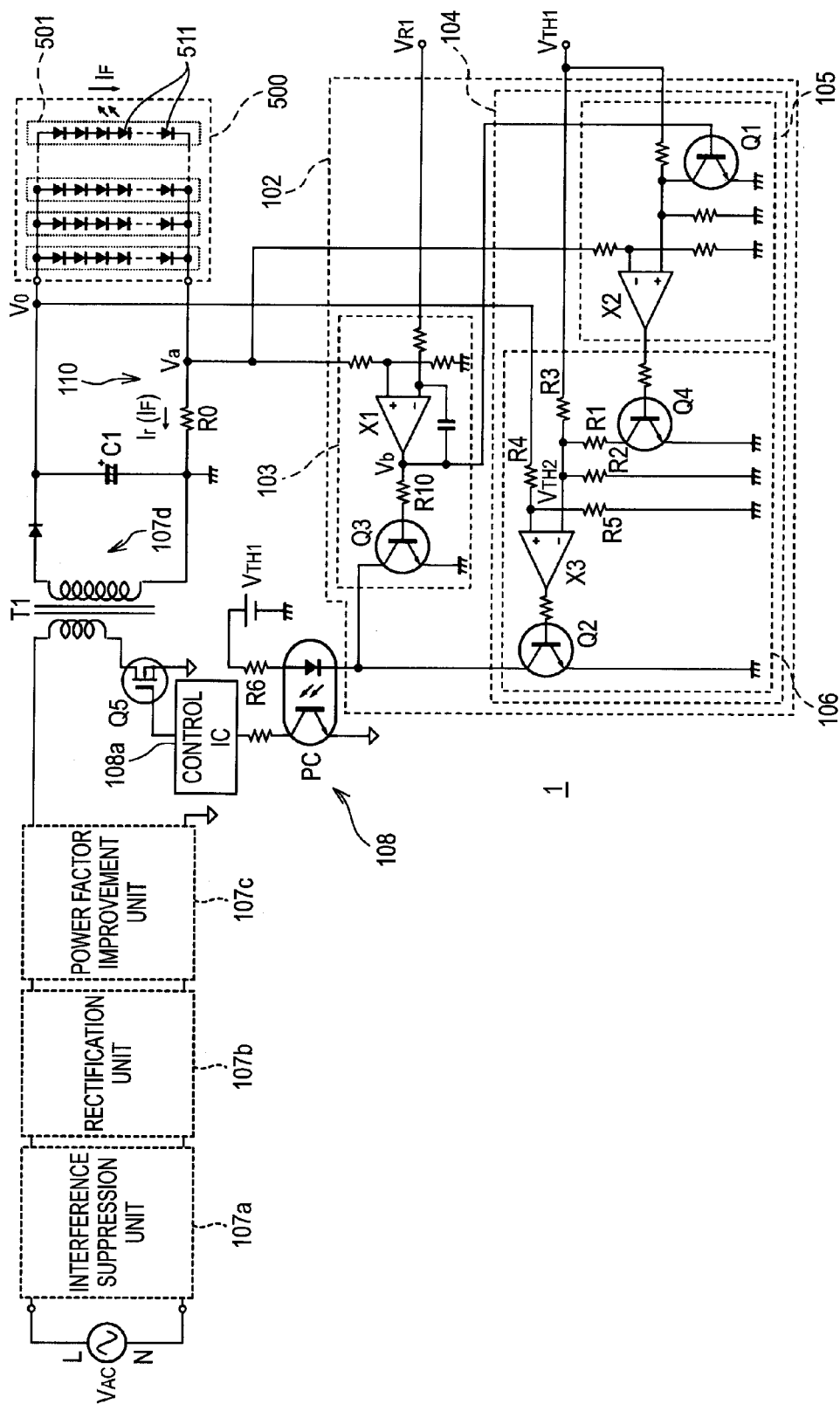
FIG. 2 is a circuit diagram illustrating a detailed configuration of the LED driving apparatus.

FIG. 2 is a circuit diagram illustrating a detailed configuration of the LED driving apparatus 1.

As shown in FIG. 2, the power conversion circuit 107d has a transformer T1 and a transistor Q5 that is connected to a primary side of the transformer T1. The transistor Q5 is a MOS-type field effect transistor, for example. However, this disclosure is not limited thereto.

The driving control unit 108 has a control IC 108a, a photo coupler PC that is connected to the control IC 108a, a resistance R6 and the like. An output terminal of the control IC 108a is connected to a gate terminal of the transistor Q5. One terminal of output terminals of the photo coupler PC is connected to the ground potential and the other terminal is connected to the control IC 108a. One of input terminals, which is different from the one of input terminal connecting the transistors Q2 and Q3, of the photo coupler PC is connected to a predetermined voltage (for example, second reference voltage $V_{TH1}$. However, this disclosure is not limited thereto) via the resistance R6 and the other end is connected to collectors of transistors Q2, Q3 that will be described later. The control IC 108a turns on or off the transistor Q5 in accordance with a signal of the photo coupler PC. The transformer T1 is energized as the transistor Q5 becomes on or off.

The current detection unit 110 has a resistance R0. The resistance R0 is arranged at the low-voltage side line that connects the power conversion circuit 107d and the LED module 500, in series with the LED module 500. The load current $I_F$ (refer to $I_r$ in FIG. 2) flown in the LED module 500 flows in the resistance R0.

The output control unit 102 is connected to an end of the resistance R0 at a side of the LED module 500. A voltage $V_a$ of the end of the resistance R0 at the LED module 500 side corresponds to the load current $I_F$. The output control unit 102 can detect whether the LED module 500 is under conducting state or opening state, based on the voltage $V_a$ of the end of the resistance R0 at the side of the LED module 500. Also, the output control unit 102 is connected to the high-voltage side line of the power feed lines to the LED module 500.

The constant-current control unit 103 has a comparator X1 and a transistor Q3. The first reference value $V_{R1}$ is input to a negative input terminal of the comparator X1 via a resistance, for example. The voltage $V_a$ from the current detection unit 110 is input to a positive input terminal of the comparator X1 via a resistance, for example. An output terminal of the comparator X1 is connected to a base of the transistor Q3 via a resistance R10, for example. An emitter of the transistor Q3 is grounded and a collector of the transistor Q3 is connected to the one of the input terminals of the photo coupler PC.

The open detection circuit 105 has a transistor Q1 and a comparator X2. A base of the transistor Q1 is connected to the output terminal of the comparator X1 and is input with an output voltage $V_b$ of the comparator X1. An emitter of the transistor Q1 is grounded. A collector of the transistor Q1 and a positive input terminal of the comparator X2 are connected to the second reference value $V_{TH1}$ via a resistance. The voltage $V_a$ from the current detection unit 110 is input to a negative input terminal of the comparator X2 via a resistance. An output terminal of the comparator X2 is connected to the open-voltage setting circuit 106.

The open-voltage setting circuit 106 has transistors Q2, Q4, a comparator X3, resistances R1, R2, R3 and the like. A base of the transistor Q4 is connected to the output terminal of the comparator X2 and an emitter of the transistor Q4 is grounded. A negative input terminal of the comparator X3 is connected to a collector of the transistor Q4 via the resistance R1, is connected to the ground potential via the resistance R2 and is connected to the second reference value $V_{TH1}$ via the resistance R3. A positive input terminal of the comparator X3 is connected to the high-voltage side line of the power feed lines to the LED module 500 via a resistance, for example. The voltage $V_0$ (output voltage $V_0$) of the high-voltage side line is input to the positive input terminal of the comparator X3 via a resistance, for example. An output terminal of the comparator X3 is connected to a base of the transistor Q2 via a resistance. An emitter of the transistor Q2 is grounded and a collector of the transistor Q2 is connected to one of the input terminals of the photo coupler PC.

[Operations of LED Driving Apparatus 1]

Below, the operations of the LED driving apparatus 11 are described. In this illustrative embodiment, when the alternating current power is input from the alternating current power supply $V_{AC}$ to the LED driving apparatus 1, i.e., when the LED driving apparatus 1 can output the direct current power, the output control unit 102 determines whether the LED module 500 is under conducting state or opening state in accordance with the detection result of the current detection unit 110. The output control unit 102 outputs a signal to the driving control unit 108 in accordance with a result of the determination and controls the output from the power conversion circuit 107d to the LED module 500. As described below, the output control unit 102 determines whether the LED module 500 is under conducting state or opening state in accordance with a value of the load current $I_F$.

Figure 3:
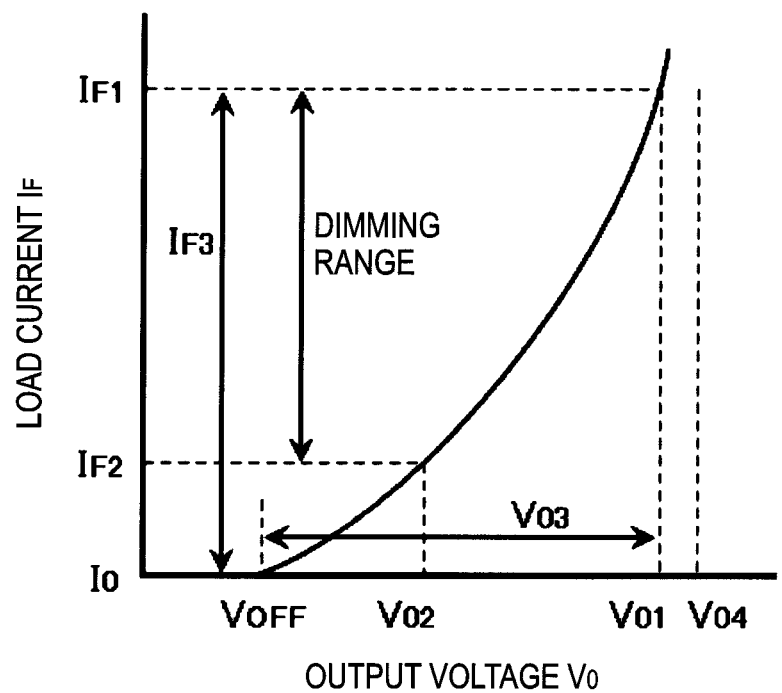
FIG. 3 is a graph illustrating a relation between load current flowing in an LED module and an output voltage from a power conversion unit.

FIG. 3 is a graph illustrating a relation between the load current $I_F$ flowing in the LED module 500 and the output voltage $V_0$ from the power conversion unit 107.

When the LED module 500 is under conducting state, the constant-current control unit 103 of the output control unit 102 outputs a first signal (feedback signal for current setting) to the driving control unit 108 so that the load current $I_F$ flowing in the LED module 500 is constant. The first signal is output, based on the first reference value $V_{R1}$. The load current $I_F$ of the LED module 500 is regulated depending on the first reference value $V_{R1}$. In other words, the first reference value $V_{R1}$ is a dimming signal and the LED module 500 is dimmed depending on the dimming signal.

That is, when the LED module 500 is under conducting state, as shown in FIG. 3, the output voltage $V_0$ monotonically increases as the load current $I_F$ increases. As the constant-current control unit 103 is controlled depending on the first reference value $V_{R1}$, the load current $I_F$ is regulated and takes a value within a dimming range from the upper limit $I_{F1}$ to the lower limit $I_{F2}$. The upper limit $I_{F1}$ of the load current $I_F$ corresponds to the upper limit $V_{01}$ of the output voltage $V_0$. Also, the lower limit $I_{F2}$ of the load current corresponds to the lower limit $V_{01}$ of the output voltage $V_0$.

In the meantime, when the LED module 500 is under conducting state, the constant-current control unit 103 performs the constant-current-control, so that additional values of the forward voltages $V_F$ of the LEDs 511 may be increased accompanied by the non-uniformity of the properties of the individual LEDs 511, the environment change of the LED module 500 and the like. In this case, the output voltage $V_0$ may exceed the upper limit $V_{01}$ within the dimming range.

In the meantime, when the LED module 500 is under opening state, the constant-voltage control unit 104 of the output control unit 102 controls so that the output voltage $V_0$ becomes a constant-voltage value. The control is performed by outputting a second signal (feedback signal for voltage setting) to the driving control unit 108. At this time, the output voltage $V_0$ is controlled so that it becomes a voltage value $V_{03}$ (which is an example of a predetermined voltage value), which is a voltage or a higher, at which the LED module 500 starts conduction, and is a voltage or lower that corresponds to the upper limit $I_{F1}$ of the load current $I_F$ flowing in the LED module 500.

When the LED module 500 is under opening state, the constant-voltage control unit 104 outputs a second signal to the driving control unit 108, based on the output voltage $V_0$ and the third reference value $V_{TH2}$ that is switched by the open detection circuit 105 on the basis of the second reference value $V_{TH1}$, as described below. As shown in FIG. 3, the output voltage $V_0$ is controlled so that it becomes a predetermined voltage value $V_{03}$ within a range between a voltage $V_{OFF}$ at which the LED module 500 starts conduction and the upper limit $V_{01}$ of the output voltage $V_0$. The second signal is output from the open-voltage setting circuit 106 to the driving control unit 108, as described below, and the driving control unit 108 controls the output voltage $V_0$ in accordance with the second signal, as described above.

In the below, the operations of the LED driving apparatus 1 will be described in the respective cases that the LED module 500 is under conduction-state and under opening state with reference to FIG. 2.

[Operation When LED Module 500 is Under Conducting State (Normal State)]

When the LED module 500 is under conducting state, the load current $I_F$ (refer to $I_F$ in FIG. 2) flows in the resistance R0. Accordingly, the detected voltage $V_a$ becomes a voltage corresponding to the load current $I_F$.

At this time, the constant-current control unit 103 uses inputs of the voltage $V_a$ based on the load current $I_F$ detected by the current detection unit 110 and the first reference value $V_{R1}$ that is a reference voltage for generating the first signal and performs the constant-current-control, based on a comparison result of the inputs. Based on the comparison result of the voltage based on the load current $I_F$ and the first reference value $V_{R1}$, the first signal is output to the driving control unit 108.

That is, in the constant-current control unit 103, when the detected voltage $V_a$ and the first reference value $V_{R1}$ are input to the comparator X1, the output voltage $V_b$ is obtained from the comparator X1. The transistor Q3 becomes on-state in accordance with the output voltage $V_b$. When the transistor Q3 becomes on-state, predetermined current depending on base current of the transistor Q3 and a current amplification factor flows to the photo coupler PC. That is, the first signal is output from the constant-current control unit 103 to the driving control unit 108.

Meanwhile, at this time, in the constant-voltage control unit 104, the transistor Q1 of the open detection circuit 105 becomes on-state in accordance with the output voltage $V_b$ from the comparator X1. When the transistor Q1 becomes on-state, the positive input terminal of the comparator X2 is connected to the ground potential and thus becomes 'L (low).' Thereby, the comparator X2 compares the potential of the positive input terminal and the detected voltage $V_a$ input to the negative input terminal and outputs 'L.'

As the output of the comparator X2 becomes 'L', the transistor Q4 of the open-voltage setting circuit 106 becomes off-state. Therefore, the negative input terminal of the comparator X3 becomes relatively 'H (high)' to the positive input terminal. Thereby, the output of the comparator X3 becomes 'L.'

As the output of the comparator X3 becomes 'L', the transistor Q2 becomes off-state. Therefore, the second signal is not output from the constant-voltage control unit 104 and the constant-voltage control is thus not performed.

[Operation When LED Module 500 is Under Opening State (Abnormal State)]

When the LED module 500 is under opening state, the load current $I_F$ does not flow in the resistance R0. Accordingly, the detected voltage $V_a$ becomes 'L', i.e., zero.

At this time, in the constant-current control unit 103, the detected voltage $V_a$ of 'L' and the first reference value $V_{R1}$ are input to the comparator X1. The output voltage $V_b$ of the comparator X1 becomes 'L.' Since the output voltage $V_b$ is 'L', the transistor Q3 becomes off-state. Accordingly, the output of the first signal from the constant-current control unit 103 is stopped and the constant-current control is not thus performed.

On the other hand, at this time, the operation of the constant-voltage control unit 104 becomes effective by the output voltage $V_b$ based on the detected voltage $V_a$. In the constant-voltage control unit 104, as the operation of the open detection circuit 105 is switched, the third reference value $V_{TH2}$ is internally generated from the second reference value $V_{TH1}$ in accordance with the detected voltage $V_a$. The third reference value $V_{TH2}$ becomes a reference value of the open-voltage setting circuit 106. The constant-voltage control unit 104 performs the constant-voltage control on the output voltage $V_0$, based on the third reference value $V_{TH2}$.

That is, in the constant-voltage control unit 104, since the output voltage $V_b$ of the comparator X1 is 'L', the output voltage $V_b$ is input, as an opening state detecting signal, to the transistor Q1 of the open detection circuit 105 and the transistor Q1 of the open detection circuit 105 becomes off-state. Therefore, the positive input of the comparator X2 connected to the collector of the transistor Q1 becomes effective. The positive input terminal of the comparator X2 is connected to the voltage based on the second reference value $V_{TH1}$ and becomes relatively 'H' with respect to the negative input terminal connected to the detected voltage $V_a$ of 'L.' Therefore, the output of the comparator X2 becomes 'H' and the transistor Q4 of the open-voltage setting circuit 106 becomes on-state.

When the transistor Q4 becomes on-state, the third reference value $V_{TH2}$, which is set by the second reference value $V_{TH1}$ and the resistances R1, R2, R3, is input the negative input terminal of the comparator X3. That is, the third reference value $V_{TH2}$ is generated as the transistor Q4 becomes on-state and thus the resistance R1 becomes effective, based on the opening state detecting signal from the comparator X1. Also, the voltage based on the output voltage $V_0$ to the LED module 500 is input to the positive input terminal of the comparator X3 via the resistance R4 and the positive input terminal of the comparator X3 is grounded via the resistance R5. Here, the third reference value $V_{TH2}$ is set so that the output voltage $V_0$ to the LED module 500 becomes the predetermined constant-voltage value $V_{03}$, which is the voltage $V_{OFF}$ or higher corresponding to the lower limit $I_0$ of the load current $I_F$ and the voltage $V_{0l}$ or lower corresponding to the upper limit $I_{F1}$ of the load current $I_F$. Based on a comparison result of the input values of the positive and negative sides of the comparator X3, a predetermined voltage is output from the comparator X3. Based on the output of the comparator X3, the transistor Q2 becomes on-state. When the transistor Q2 becomes on-state, predetermined current depending on the base current of the transistor Q2 and a current amplification factor flows to the photo coupler PC. That is, the second signal is output from the constant-voltage control unit 104 to the driving control unit 108 so that the output voltage becomes the predetermined voltage value $V_{03}$.

Effects of Illustrative Embodiment

As described above, when the LED module 500 is under opening state, the LED driving apparatus 1 controls so that the output voltage to the LED module 500 becomes lower than the voltage $V_{01}$ corresponding to the upper limit $I_{F1}$ of the load current $I_F$. As a result, when the LED module 500 is attached to and detached from the LED driving apparatus 1 while the LED driving apparatus 1 operates, the current flowing in the LED module 500 starts to flow from a current value smaller than the upper limit $I_{F1}$ of the load current $I_F$, and the current gradually increases and reaches the upper limit $I_{F1}$. When the LED module 500 is under opening state, the output voltage to the LED module 500 is set to any value smaller than the voltage $V_{0l}$ corresponding to the upper limit $I_{F1}$ of the load current $I_F$, so that it is possible to suppress a value of peak current flowing in the LED module 500. Therefore, the breakdown (burnout and the like) of the LEDs 511 due to the inrush current is suppressed.

Figure 4:
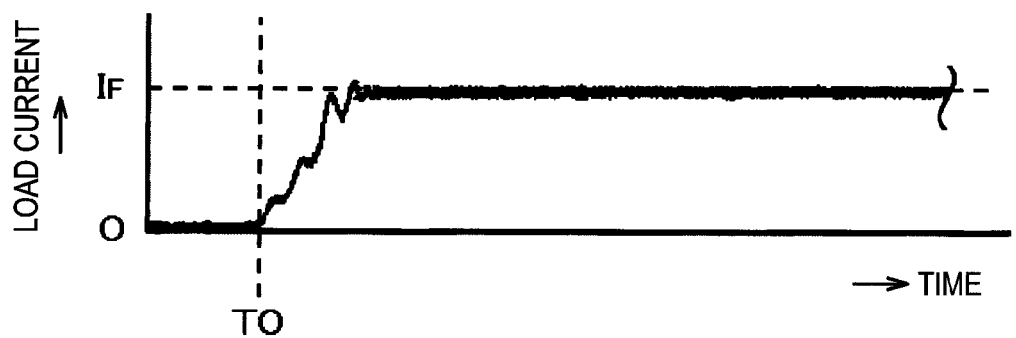
FIG. 4 is a graph illustrating an example of a change in current that is supplied when an LED module is attached to and detached from the LED driving apparatus according to the illustrative embodiment.

FIG. 4 is a graph illustrating an example of a change in current that is supplied when the LED module 500 is attached to and detached from the LED driving apparatus 1 according to the illustrative embodiment.

Figure 5:
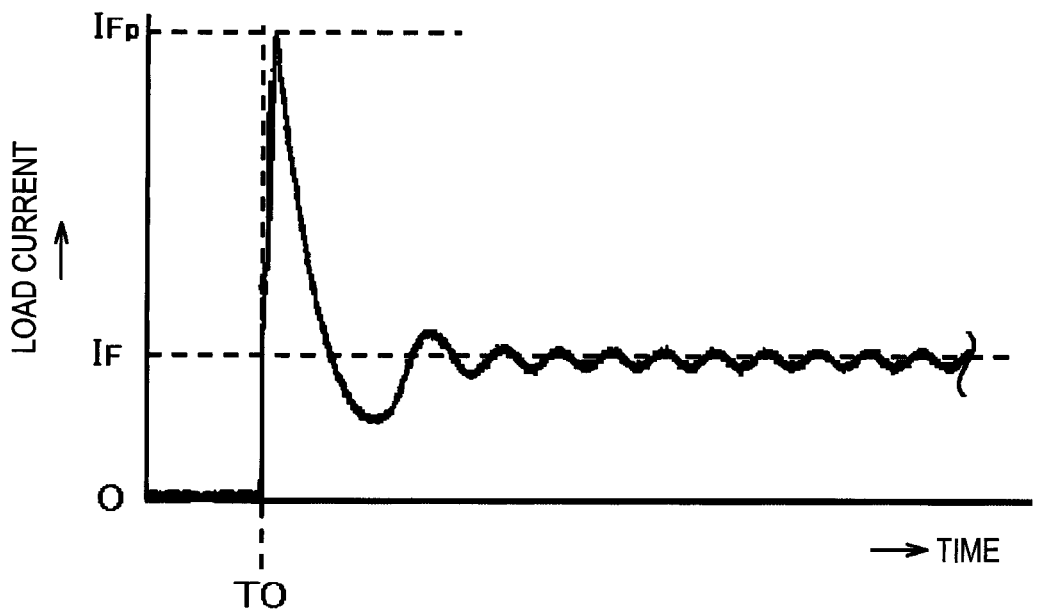
FIG. 5 is a graph illustrating an example of a change in current that is supplied when an LED module is attached to and detached from an LED driving apparatus according to the background art.
Figure 6:
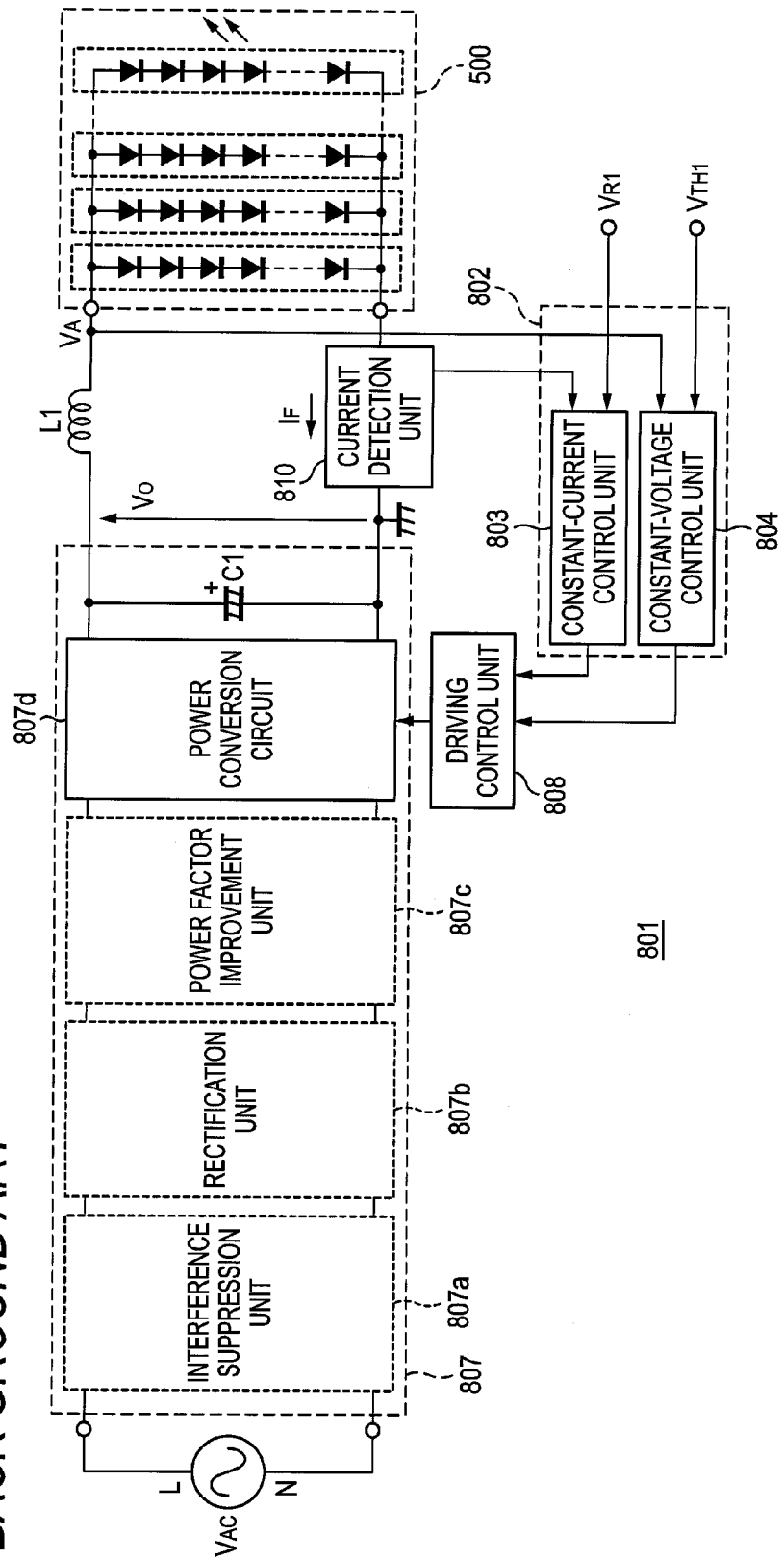
FIG. 6 is a circuit diagram illustrating an example of a configuration of an LED driving apparatus according to the background art.

In FIG. 4, time before time T0 indicates a period in which the LED module 500 is under opening state and time after time T0 indicates a period in which the LED module 500 is under conducting state. As shown in FIG. 4, in the LED driving apparatus 1, when the LED module 500 shifts from the opening state to the conducting state (around time T0), the load current $I_F$ smoothly increases from the $I_{F3}$, so that the inrush current shown in FIG. 5 does not flow in the LED module 500. Thereby, it is possible to suppress the LEDs 511 configuring the LED module 500 from being damaged.

The LED driving apparatus 1 has the simple circuit in which the relatively simple circuit devices such as comparator, transistor and the like are used while the large circuit device such as inductor is not used. Accordingly, it is possible to realize the LED driving circuit 1 that can be miniaturized and has a high product quality and a low manufacturing cost.

[Others]

The LED driving circuit may not have the dimming function.

The power conversion circuit and the peripheral circuits may not have an insulating type configuration. Also, the LED driving circuit may be a circuit that converts the direct current power input from the direct current power supply by the power conversion circuit and feeds the same to the LED module.

Instead of the transistor connected to the input terminal of the comparator of the open detection circuit and the transistor connected to the input terminal of the comparator of the open-voltage setting circuit, the other type-switch device such as field effect transistor may be used.

The photo couplers may be individually connected to the respective collectors of the transistor Q3 of the constant-current control unit 103 and the transistor Q2 of the constant-voltage control unit 104 and the signals may be output to the control IC 108a.

In the meantime, the LED module that is driven by the LED driving apparatus is not limited to the above module having the plurality of LED arrays. The LED module may have one LED array. Also, the LED array is not limited to the LED array having the plurality of LEDs. The LED array may have only one LED. That is, the LED module may have only one LED. For example, the LED module may have one LED array in which two LEDs are arranged in series. Also, the LED module may have a configuration in which two LEDs are arranged in parallel.

The illustrative embodiments are just illustrative example and is not limited to limit this disclosure. The scope of this disclosure is indicated by the claims and includes all modifications and equivalents.

What is claimed is:

1. An Light Emitting Diode (LED) driving apparatus that drives an LED module having at least one LED, comprising:
   a power feed unit that feeds direct current power to the LED module;
   a driving control unit that performs driving control of the power feed unit;
   a current detection unit that detects load current flowing in the LED module; and
   an output control unit that determines whether the LED module is under conducting state or opening state in accordance with a detection result of the current detection unit, and outputs a signal to the driving control unit in accordance with a result of the determination to thus control an output from the power feed unit,
   wherein, when the LED module is under conducting state, the output control unit outputs a first signal to the driving control unit so that the load current is constant when a voltage is applied to the LED module by the power feed unit,
   wherein, when the LED module is under opening state, the output control unit outputs a second signal to the driving control unit so that a voltage, which is applied to the LED module by the power feed unit, becomes a predetermined constant-voltage value,
   wherein the predetermined constant-voltage value is at least a voltage value at which the LED module starts conduction, and at most a voltage value corresponding to an upper limit of the load current when the LED module is under conducting state,
   wherein the output control unit has a constant-current control unit that performs constant-current control and a constant-voltage control unit that performs constant-voltage control,
   wherein, when the LED module is under conducting state the constant-current control unit performs the constant-current-control based on a comparison result of a voltage corresponding to the load current detected by the current detection unit and a first reference value that is a reference voltage for generating the first signal, and
   wherein, when the LED module is under opening state, by using: a voltage corresponding to the load current detected by the current detection unit; a voltage based on an output voltage of the power feed unit; a second reference value that is a voltage for generating the second signal; and an opening state detecting signal from the constant-current control unit, as inputs, the constant-voltage control unit generates a third reference value, based on the second reference value and the opening state detecting signal, and outputs the second signal based on a comparison result of the voltage based on the output voltage of the power feed unit and the third reference value, and thus the constant-voltage control unit performs the constant-voltage control on the output voltage of the power feed unit.

2. The LED driving apparatus according to claim 1, wherein, when the LED module is under conducting state, the constant-current control unit outputs the first signal to the driving control unit, based on a comparison result of the voltage corresponding to the load current and the first reference value, and when the LED module is under opening state, the constant-current control unit stops the output of the first signal, and
wherein, when the LED module is under opening state, the constant-voltage control unit outputs the second signal to the driving control unit, based on a comparison result of the voltage based on the output voltage and the second reference value, and when the LED module is under conducting state, the constant-voltage control unit stops the output of the second signal.

* * * * *